(12) United States Patent
Blanchard et al.

(10) Patent No.: US 12,038,042 B2
(45) Date of Patent: Jul. 16, 2024

(54) SUSPENSION THRUST BEARING DEVICE

(71) Applicant: Aktiebolaget SKF, Gothenburg (SE)

(72) Inventors: Xavier Blanchard, Saint-Cyr-sur-Loire (FR); Thomas Lepine, Tours (FR); Julien Maffucci, Ballan-Miré (FR); Desire Vidot, Ballan-Miré (FR)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 17/092,372

(22) Filed: Nov. 9, 2020

(65) Prior Publication Data

US 2021/0222732 A1    Jul. 22, 2021

(30) Foreign Application Priority Data

Jan. 20, 2020  (DE) .......................... 102020200586.9

(51) Int. Cl.
*F16C 19/10* (2006.01)
*B60G 11/15* (2006.01)
*B60G 15/06* (2006.01)
*F16F 9/54* (2006.01)

(52) U.S. Cl.
CPC .............. *F16C 19/10* (2013.01); *B60G 11/15* (2013.01); *B60G 15/067* (2013.01); *F16F 9/54* (2013.01); *B60G 2202/31* (2013.01); *B60G 2204/418* (2013.01); *F16C 2326/05* (2013.01)

(58) Field of Classification Search
CPC ...... F16C 19/10; F16C 2326/05; F16C 33/80; B60G 11/15; B60G 15/067; B60G 2202/31; B60G 2204/418; B60G 2204/1242; B60G 15/06; F16F 9/54
See application file for complete search history.

(56) References Cited

U.S. PATENT DOCUMENTS

| 4,699,530 | A | * | 10/1987 | Satoh | ..................... F16C 27/066 384/615 |
|---|---|---|---|---|---|
| 4,854,745 | A | * | 8/1989 | Kamimura | .............. F16C 17/04 384/607 |
| 7,922,397 | B2 | | 4/2011 | Beauprez et al. | |
| 8,308,176 | B2 | | 11/2012 | Lenon et al. | |
| 2009/0180719 | A1 | * | 7/2009 | Miyata | ..................... F16C 33/20 384/147 |

(Continued)

FOREIGN PATENT DOCUMENTS

| CN | 101088786 B | * | 2/2011 | .......... B60G 15/068 |
|---|---|---|---|---|
| CN | 102822542 A | | 12/2012 | |

(Continued)

OTHER PUBLICATIONS

Machine Translation of DE102017208997 (Year: 2018).*

*Primary Examiner* — Drew J Brown
(74) *Attorney, Agent, or Firm* — GARCIA-ZAMOR INTELLECTUAL PROPERTY LAW, LLC; Ruy Garcia-Zamor

(57) ABSTRACT

A suspension thrust bearing device providing a lower support cap, an upper bearing cap and at least one bearing arranged between the caps. The upper bearing cap includes an outer skirt radially surrounding the lower support cap. The lower support cap having at least one annular deflector flange extending towards the outer skirt of the upper bearing cap while remaining radially spaced apart from the outer skirt, the deflector flange having a lower inclined surface extending obliquely downwards.

18 Claims, 2 Drawing Sheets

(56) References Cited

U.S. PATENT DOCUMENTS

| | | | |
|---|---|---|---|
| 2010/0104228 A1* | 4/2010 | Kaneko | F16C 33/20 384/420 |
| 2011/0274384 A1* | 11/2011 | Montboeurf | F16C 19/10 384/607 |
| 2011/0311177 A1 | 12/2011 | Viault | |
| 2012/0251024 A1* | 10/2012 | Brisson | B60G 15/068 384/513 |
| 2012/0257849 A1* | 10/2012 | Corbett | B60G 15/067 384/607 |
| 2012/0308167 A1 | 12/2012 | Chamousset | |
| 2014/0185971 A1* | 7/2014 | Nagashima | F16C 33/1065 384/291 |
| 2014/0010491 A1 | 11/2014 | Lutz | |
| 2014/0355915 A1* | 12/2014 | Saito | F16C 33/103 384/368 |
| 2015/0354629 A1* | 12/2015 | Sakairi | B60G 15/068 384/420 |
| 2016/0089946 A1 | 3/2016 | Bedeau et al. | |
| 2016/0089947 A1* | 3/2016 | Bedeau | F16C 19/10 248/634 |
| 2016/0243915 A1 | 8/2016 | Bedeau | |
| 2017/0261032 A1 | 9/2017 | Lepine et al. | |
| 2018/0106292 A1* | 4/2018 | Sekine | F16C 33/20 |
| 2018/0372152 A1* | 12/2018 | Gaultier | F16C 33/3887 |
| 2019/0308479 A1 | 10/2019 | Montboeuf | |
| 2021/0010538 A1 | 1/2021 | Chambonneau | |
| 2021/0222733 A1* | 7/2021 | Blanchard | F16C 19/10 |

FOREIGN PATENT DOCUMENTS

| | | | | |
|---|---|---|---|---|
| DE | 102007024628 A1 * | 12/2007 | | B60G 15/068 |
| DE | 102012215912 A1 | 3/2014 | | |
| DE | 102013223927 A1 | 5/2015 | | |
| DE | 102014206658 A1 | 10/2015 | | |
| DE | 102016221841 A1 | 5/2018 | | |
| DE | 102016221842 A1 | 5/2018 | | |
| DE | 102016125175 A1 | 6/2018 | | |
| DE | 102017204818 A1 | 9/2018 | | |
| DE | 102017208997 A1 * | 11/2018 | | |
| DE | 102017210728 A1 | 12/2018 | | |
| DE | 102018117595 A1 | 1/2020 | | |
| FR | 2936580 A1 | 4/2010 | | |
| FR | 2954433 A1 | 6/2011 | | |
| FR | 2965028 A1 | 3/2012 | | |
| FR | 2979680 A1 * | 3/2013 | | B60G 15/068 |
| JP | 2009270720 A * | 11/2009 | | B60G 15/068 |
| KR | 20130073141 A | 7/2013 | | |
| KR | 20200096540 A | 8/2020 | | |
| WO | WO-2016175041 A1 * | 11/2016 | | B60G 15/068 |
| WO | 2018185006 A1 | 10/2018 | | |
| WO | 2019119320 A1 | 6/2019 | | |

* cited by examiner

SUSPENSION THRUST BEARING DEVICE

CROSS-REFERENCE TO RELATED APPLICATIONS

This application claims priority to German Patent Application no. 102020200586.9, filed Jan. 20, 2020, the contents of which is fully incorporated herein by reference.

TECHNICAL FIELD OF THE INVENTION

The present invention relates to the field of suspension thrust bearing devices, used in particular for motor vehicles in the suspension struts of the steered road wheels.

BACKGROUND OF THE INVENTION

A suspension thrust bearing device is generally provided with a rolling bearing comprising an upper ring and a lower ring between which are positioned rolling elements, for example balls or rollers, and with lower and upper caps. The lower and upper caps form housings for the rings of the rolling bearing and provide the interface between the rings and the neighboring elements.

The suspension thrust bearing device is arranged in the top part of the suspension strut between the vehicle body and a suspension spring. The suspension spring is mounted around a damping piston rod, the end of which is connected to the vehicle body. The suspension spring axially bears, directly or indirectly, on the lower cap of the thrust bearing device.

The suspension thrust bearing device allows transmission of axial and radial forces between the suspension spring and the vehicle body, while allowing a relative rotational movement between the lower cap and the upper cap resulting from a deflection of the steered wheels of the vehicle and/or compression of the suspension spring.

Generally, the upper cap of the suspension thrust bearing device is provided with a plurality of hooks arranged on an outer skirt and adapted to diametrically interfere with a plurality of hooks of the lower cap. The hooks of each cap are spaced apart from each other in the circumferential direction.

The hooks form retaining means provided to axially retain the upper and lower caps relative to one another. These hooks also form narrow passageways in order to prevent the intrusion of foreign matter radially between the outer skirt of the upper cap and the lower cap.

However, a suspension thrust bearing device is generally exposed to various kinds of pollution, especially to water flow.

With such suspension thrust bearing device, a water flow can easily be infiltrated between the outer skirt of the upper cap and the lower cap, and then be directed towards the rolling bearing and be introduced inside the latter.

One aim of the present invention is to overcome this drawback.

SUMMARY OF THE INVENTION

It is a particular object of the present invention to provide a suspension thrust bearing device having good sealing properties to protect the bearing against ingress of water while ensuring a low friction torque.

The invention relates to a suspension thrust bearing device comprising a lower support cap, an upper bearing cap and at least one bearing arranged between the caps, the upper bearing cap comprising an outer skirt radially surrounding the lower support cap.

According to a general feature, the lower support cap comprises at least one annular deflector flange extending towards the outer skirt of the upper bearing cap while remaining radially spaced apart from the outer skirt. The deflector flange has a lower inclined surface extending obliquely downwards.

The deflector flange enables to avoid water flow to go up in the device and damage the bearing. The deflector flange forms a barrier for diverting the water flow directed upwards between the outer skirt of the upper bearing cap and the lower support cap. With the lower inclined surface of the deflector flange, the water flow is re-oriented towards the opening formed between the free end of the outer skirt of the upper bearing cap and the lower support cap.

For example, the lower inclined surface of the deflector flange may form an angle with the axis of the device comprised between 45° and 65°.

The lower support cap may comprise a radial portion in contact with a lower ring of the bearing, the deflector flange extending outwards from the radial portion. The lower inclined surface of the deflector flange extends obliquely downwards from the radial portion.

Preferably, the lower support cap further comprises a radial protrusion extending radially outwards from the radial portion and having a lower surface which extends radially outwards a lower surface of the radial portion delimiting a bearing surface for a suspension spring, an annular groove being formed axially between the radial protrusion and the deflector flange and opening in a radial direction outwards.

In one embodiment, the radial protrusion of the lower support cap has an upper inclined surface extending obliquely downwards. This facilitates the circulation of the re-oriented water flow by gravity outside of the device. Alternatively, the radial protrusion of the lower support cap may have an upper surface extending radially.

In one embodiment, the lower support cap further comprises an annular rib extending axially towards a radial portion of the upper bearing cap while remaining axially spaced apart from the radial portion. The annular rib may extend from the radial portion and project axially upwards, or may flush, with respect to a free upper end of the lower ring of the bearing. The annular rib of the lower support cap forms an additional barrier to protect the bearing.

In one embodiment, the upper bearing cap further comprises an annular rib extending axially towards an upper surface of the deflector flange of the lower support cap while remaining axially spaced apart from the deflector flange.

The annular rib of the upper bearing cap also forms an additional barrier to protect the bearing.

In a specific embodiment, both the upper surface of the deflector flange and a lower surface of the rib of the upper bearing cap extend obliquely downwards and parallel to each other. Accordingly, the gap between these surfaces is constant.

Alternatively, the upper surface of the deflector flange and/or the lower surface of the rib of the upper bearing cap may have different shape.

The annular rib of the upper bearing cap may radially surround the annular rib of the lower support cap.

In one embodiment, the upper bearing cap comprises an inner skirt comprising a plurality of hooks able to interfere diametrically with hooks provided on the lower support cap. Alternatively, the outer skirt of the upper bearing cap may comprise a plurality of hooks able to interfere diametrically with the deflector flange of the lower support cap.

BRIEF DESCRIPTION OF THE DRAWINGS

The present invention and its advantages will be better understood by studying the detailed description of specific embodiments given by way of a non-limiting examples and illustrated by the appended drawings on which.

DETAILED DESCRIPTION OF THE INVENTION

Figure 1:
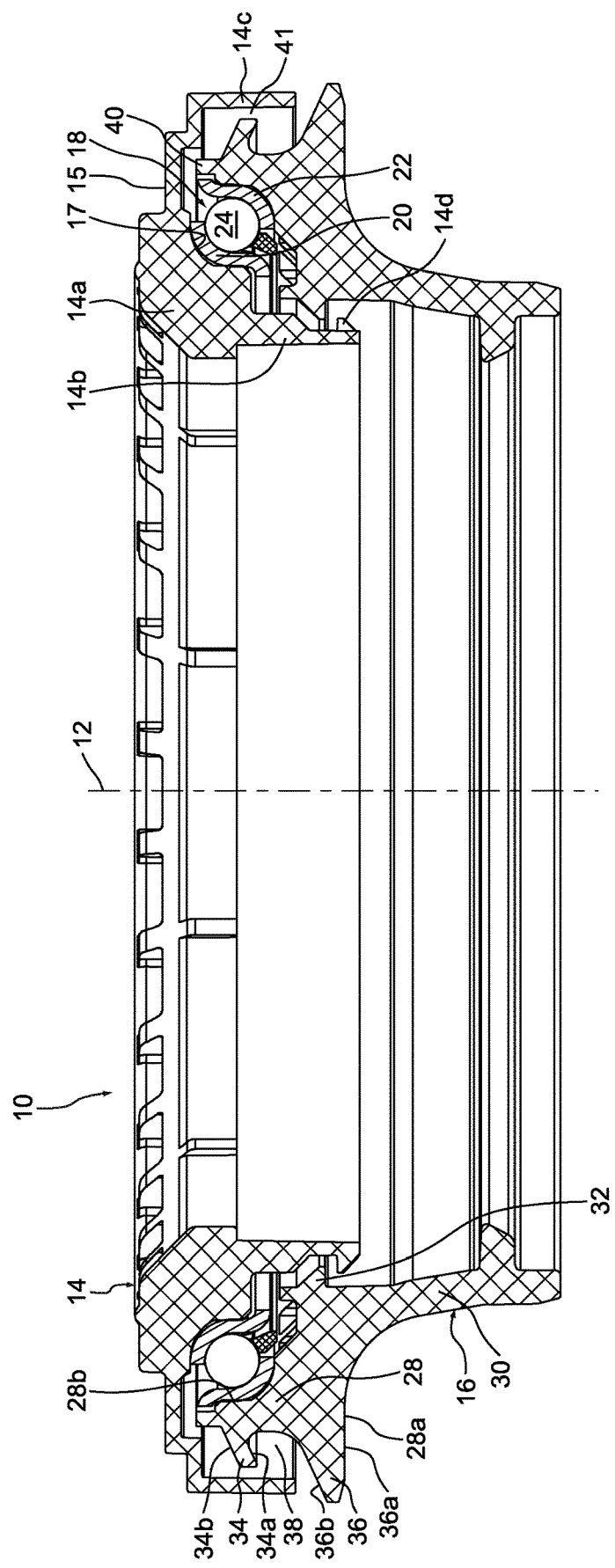
FIG. 1 is a cross-section of a suspension thrust bearing device according to a first example of the invention.

The suspension thrust bearing device 10 represented on FIG. 1 is adapted to be installed between a top retainer seat suitable of resting, directly or indirectly, in an element of a chassis of the motor vehicle, and a suspension spring.

The device 10, with an axis 12, comprises an upper bearing cap 14, a lower support cap 16, and a rolling bearing 18 axially interposed between the caps 14, 16. The caps 14, 16 are mounted in direct contact with the rolling bearing 18 without the interposition of an intermediate element.

As will be described later, the lower support cap 16 is designed to limit any water flow directed towards the rolling bearing 18.

The upper bearing cap 14 may consist in one part, for example from plastic material, such as polyamide PA 6.6 which may or may not be reinforced with glass fibers.

The upper bearing cap 14 comprises a radial portion 14a, an annular axial inner skirt 14b, and an annular axial outer skirt 14c radially surrounding the inner skirt 14b. The radial portion 14a provides an upper surface 15 intended to face the top retainer seat, and an opposite lower surface 17 in contact with the rolling bearing 18. The upper and lower surfaces 15, 17 define the thickness of the radial portion 14a. In the illustrated example, the radial portion 14a has a stepped shape.

The outer skirt 14c radially surrounds the lower support cap 16. The inner and outer skirts 14b, 14c extend axially downwards from the radial portion 14a. In the illustrated example, the outer skirt 14c extends a large-diameter edge of the radial portion 14a. The inner skirt 14b extends a small-diameter edge of the radial portion 14a.

The upper bearing cap 14 further comprises a plurality of inner hooks 14d arranged on the inner skirt 14b and extending radially outwards. The hooks 14d extend from the outer surface of the inner skirt 14b radially outward in the direction of the lower support cap 16. In the illustrated example, the hooks 14d are arranged on the lower end of the inner skirt 14b. In the illustrated example, the hooks 14d are spaced relative to one another in the circumferential direction. Alternatively, an annular hook may be provided on the outer surface of the skirt 14b.

The rolling bearing 18 is entirely located radially between the skirts 14b, 14c of the upper bearing cap. The rolling bearing 18 comprises an upper ring 20 in contact with the upper bearing cap 14, a lower ring 22 in contact with the lower support cap 16, and one row of rolling elements 24, here balls, arranged between raceways formed on the rings. In the illustrated example, the rolling bearing 18 is of the oblique contact type to absorb both the radial forces and the axial forces exerted on the device.

The upper ring 20 and the lower ring 22 of the rolling bearing are made of a thin metal sheet, which has been stamped or rolled so as to define toroidal raceways for the rolling elements 24 between the two rings. The upper ring 20 is in contact with the lower surface 17 of the radial portion 14a of the upper bearing cap. The lower ring 22 is in contact with an upper surface of the lower support cap 16. The rolling bearing 18 also comprises a cage (not referenced) between the upper and lower rings 20, 22 so as to maintain a regular circumferential spacing between the rolling elements 24.

The lower support cap 16 may consist in one part, for example from plastic material, such as polyamide PA 6.6 which may or may not be reinforced with glass fibers.

The lower support cap 16 comprises an annular radial portion 28 in the form of a plate, and an annular axial skirt 30 which extends a small-diameter edge of the radial portion 28. The skirt 30 extends axially on the side opposite to the upper bearing cap 14 and the rolling bearing 18. The skirt 30 allows centering of the suspension spring. This centering is achieved by the outer surface of the skirt 30. The radial portion 28 provides a lower annular radial surface 28a delimiting a bearing surface for the suspension spring, and an upper surface 28b in contact with the lower ring 22 of the bearing and of complementary form. A free upper end of the lower ring 22 axially protrudes with respect to the radial portion 28.

The lower support cap 16 also comprises a plurality of inner hooks 32 arranged on the radial portion 28 and extending radially inwards. The hooks 32 extend from the bore of the radial portion 28 radially inward in the direction of the inner skirt 14b of the upper bearing cap. The hooks 32 are spaced apart from each other in the circumferential direction, preferably regularly. Alternatively, the lower support cap 16 may comprise one annular inner hook, i.e. which is continuous in the circumferential direction.

The hooks 32 are disposed axially above the hooks 14d of the inner skirt 14b of the upper bearing cap. The hooks 14d have an outer diameter higher than the inner diameter of the hooks 32 so as to be able to interfere diametrically with the hooks 32 in the case of relative axial displacement of the bearing cap 14 and the support cap 16. The hooks 14d of the upper bearing cap form axial retention means cooperating with complementary axial retention means of the support cap 16 formed by the hooks 32.

Otherwise, the hooks 14d, 32 form narrow passageways in order to prevent the intrusion of foreign matter radially between the internal skirt 14b of the upper bearing cap and the bore of the skirt 30 of the lower support cap.

The lower support cap 16 further comprises an annular deflector flange 34 extending towards the outer skirt 14c of the upper bearing cap while remaining radially spaced apart from the outer skirt. More generally, the flange 34 remains spaced apart from the upper bearing cap 14.

The flange 34 is located radially slightly away from the bore of the outer skirt 14c of the upper bearing cap to form a labyrinth sealing portion. An annular radial labyrinth seal 41 is formed between the flange 34 and the outer skirt 14c of the upper bearing. For instance, the radial gap between the flange 34 and the outer skirt 14c cap may be less than 2 mm, and for instance comprised between 1 mm and 1.4 mm, and notably equal to 1.2 mm.

The flange 34 protrudes outwards from the radial portion 28 of the lower support cap. The flange 34 extends outwards from the outer surface of the radial portion 28. The flange 34 extends obliquely downwards. The flange 34 has a lower inclined surface 34a and an opposite upper inclined surface 34b. The lower and upper inclined surfaces 34a, 34b define the thickness of the flange 34. The lower and upper inclined surfaces 34a, 34b extend obliquely downwards from the outer surface of the radial portion 28 of the lower support cap.

The upper inclined surface 34b of the flange is oriented axially towards the radial portion 14a of the upper bearing cap. In a radial plane of the device as shown on FIG. 1, the lower inclined surface 34a forms an angle with the axis 12 of the device which may be preferably comprised between extending 45° and 65°. In the illustrated example, the upper inclined surface 34b of the flange extends parallel to the lower inclined surface 34a.

As previously indicated, in the illustrated example, the flange 34 extends obliquely downwards. Thus, both the lower inclined surface 34a and the upper inclined surface 34b of the flange extend obliquely downwards. Alternatively, the flange 34 may extend radially. In this case, the upper inclined surface 34b of the flange may extend radially, but the lower inclined surface 34a of the flange still extend obliquely downwards from the radial portion 28 of the lower support cap.

The lower support cap 16 further comprises an annular radial protrusion 36 extending radially outwards from the radial portion 28. The protrusion 36 protrudes outwards from the outer surface of the radial portion 28.

The protrusion 36 extends below the outer skirt 14c of the upper bearing cap. In the illustrated example, the protrusion 36 extends radially outwards beyond the outer skirt 14c. The protrusion 36 has a lower surface 36a and an opposite upper surface 36b. The lower and upper surfaces 36a, 36b define the thickness of the protrusion 36. The upper surface 36b of the protrusion extends from the outer surface of the radial portion 28. The lower surface 36a extends radially the lower radial surface 28a of the radial portion delimiting the bearing surface for the suspension spring. In the illustrated example, the upper surface 36b of the protrusion extends obliquely downwards. Alternatively, the upper surface 36b may extend radially.

The protrusion 36 is located axially below the flange 34. The protrusion 36 is axially spaced apart from the flange 34. The upper surface 36b of the protrusion is oriented axially towards the lower inclined surface 34a of the flange. An annular groove 38 is axially formed between the protrusion 36 and the flange 34. More precisely, the groove 38 is axially formed between the upper surface 36b of the protrusion and the lower inclined surface 34a of the flange. The groove 38 opens in a radial direction outwards.

In the illustrated example, the lower support cap 16 also comprises an annular rib 40 extending axially from the radial portion 28 towards the radial portion 14b of the upper bearing cap. The rib 40 extends from the upper face of the radial portion 28 of the lower support cap. The rib 40 remains axially spaced apart from the lower surface 17 of the radial portion.

The rib 40 radially surrounds a free upper end of the lower ring 22 of the bearing. In the illustrated example, the rib 40 is flush with respect to the free upper end of the lower ring 22. Alternatively, the rib 40 may project axially upwards with respect to the free upper end of the lower ring 22 while remaining axially spaced apart from the radial portion 14b of the upper bearing cap. In another variant, the lower support cap 16 may be deprived of the rib 40.

The flange 34 of the lower support cap forms a deflector against which is broken the water flow thrown up in the direction of the rolling bearing 18. With the lower inclined surface 34a of the flange, the water flow is re-oriented towards the opening formed between the free end of the outer skirt 14c of the upper bearing cap and the radial portion 28 of the lower support cap. A circulation of water is obtained inside the groove 28.

Figure 2:
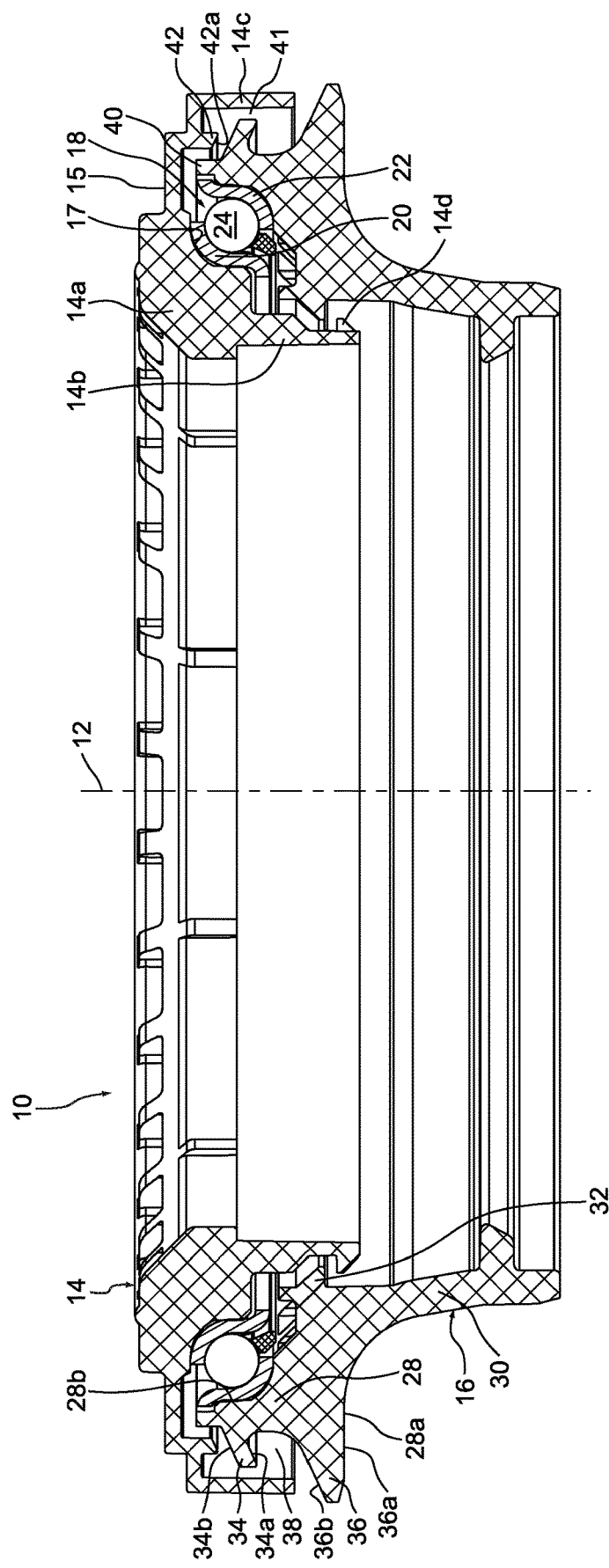
FIG. 2 is a cross-section of a suspension thrust bearing device according to a second example of the invention.

The example shown on FIG. 2, in which identical parts are given identical references, differs from the first example in that the upper bearing cap 14 further comprises an annular rib 42 extending axially towards the flange 34 of the lower support cap. The rib 42 extends from the radial portion 14a of the upper bearing cap. The rib 42 protrudes from the lower surface 17 of the radial portion 14a. The rib 42 of the upper bearing cap forms an additional barrier to limit any splashes of water directed towards the rolling bearing 18.

The flange 34 of the lower support cap extends radially outwards beyond the rib 42. The rib 42 remains axially spaced apart from the flange 34 of the lower support cap. The rib 42 extends axially towards the upper inclined surface 34b of the flange while remaining axially spaced apart from this surface. The rib 42 is located axially slightly away from the upper inclined surface 34b of the flange to form a labyrinth sealing portion. An annular axial labyrinth seal (not referenced) is formed between the rib 42 and the upper inclined surface 34b of the flange. For instance, the axial gap between the rib 42 and the upper inclined surface 34b may be less than 2 mm, and for instance comprised between 1 mm and 1.4 mm, and notably equal to 1.2 mm.

In the illustrated example, the rib 42 has a lower inclined surface 42a axially facing the upper inclined surface 34b of the flange which extends parallel to this upper inclined surface 34b. Alternatively, the lower surface 42a of the rib may have other shape. For example, the lower surface 42a may extend radially.

The rib 42 is radially located between the outer skirt 14c of the upper bearing cap, and between the bearing 18 and the rib 40 of the lower support cap. The rib 42 radially surrounds the rib 40 and the bearing 18. The lower inclined surface 42a is axially offset downwards with respect to the upper surface of the rib 40. The lower surface 42a is axially offset downwards with respect to the outer diameter of the rolling bearing 18. In the illustrated example, the lower surface 42a is axially offset downwards with respect to the free upper ends of the lower and upper rings 22, 20.

In the illustrated example, the rib 42 is located radially slightly away from the rib 40. An annular radial labyrinth seal (not referenced) is formed between the ribs 40, 42. For instance, the radial gap between the ribs 40, 42 may be less than 2 mm, and for instance comprised between 1 mm and 1.4 mm, and notably equal to 1.2 mm. In an alternative example, the radial gap between the ribs 40, 42 may be filled by grease.

In the illustrated examples, the thrust bearing device comprises an angular contact rolling bearing provided with one row of balls. The thrust bearing device may comprise other types of rolling bearing, for example bearings having four points contacts and/or with at least double rows of balls. The rolling bearing of the device may comprise other types of rolling elements, for example rollers. In another variant, the bearing of the device may also be a sliding bearing having no rolling elements.

The invention claimed is:

1. A suspension thrust bearing device comprising:
    a lower support cap,
    an upper bearing cap, and
    a bearing arranged between the lower support cap and the upper bearing cap, the upper bearing cap comprising an outer skirt radially surrounding the lower support cap, the outer skirt having a uniform thickness, when viewed in cross-section the outer skirt has a free axial end, wherein the lower support cap further comprises:
an annular deflector flange extending towards the outer skirt of the upper bearing cap while remaining radially spaced apart from the outer skirt, the deflector flange having a lower inclined surface extending obliquely downwards,
a radial portion in contact with a lower ring of the bearing, the at least one annular deflector flange extending outwards from the radial portion, and
a radial protrusion extending radially outwards from the radial portion and having a lower surface that extends radially outwards from a lower surface of the radial portion delimiting a bearing surface for a suspension spring, wherein
the lower support cap further comprises a first axially extending annular surface extending from a side of the annular deflector flange and a second axially extending annular surface extending from an opposite side of the annular deflector flange, an innermost axially extending radial surface of the outer skirt facing both the first and the second axially extending annular surfaces of the lower support cap, and wherein
the lower support cap has a radially outer surface located between the at least one annular deflector flange and the radial protrusion, a portion of the radially outer surface that axially overlaps the outer skirt getting radially closer to the outer skirt as the radially outer surface extends axially from the at least one annular deflector flange to the radial protrusion, a portion of the outer skirt extending axially so that an innermost axially extending radial surface of the radial skirt extends up to the free end.

2. The device according to claim 1, wherein the lower inclined surface of the annular deflector flange forms an angle with an axially extending central axis of the device comprised between 45° and 65°.

3. The device according to claim 1, wherein the lower support cap comprises a radial portion in contact with a lower ring of the bearing, the annular deflector flange extending outwards from the radial portion.

4. The device according to claim 3, wherein the lower support cap further comprises a radial protrusion extending radially outwards from the radial portion and having a lower surface that extends radially outwards from a lower surface of the radial portion delimiting a bearing surface for a suspension spring, an annular groove being formed axially between the radial protrusion and the deflector flange and opening in a radial direction outwards.

5. The device according to claim 4, wherein the radial protrusion of the lower support cap has an upper inclined surface extending obliquely downwards.

6. The device according to claim 1, wherein the lower support cap further comprises an annular rib extending axially towards a radial portion of the upper bearing cap while remaining axially spaced apart from the radial portion.

7. The device according to claim 6, wherein the lower support cap comprises a radial portion in contact with a lower ring of the bearing, the deflector flange extending outwards from the radial portion, and wherein the annular rib extends from the radial portion of the lower support cap and projects axially upwards, or is flush, with respect to a free upper end of the lower ring of the bearing.

8. The device according to claim 1, wherein the upper bearing cap further comprises an annular rib extending axially towards an upper surface of the deflector flange of the lower support cap while remaining axially spaced apart from the deflector flange.

9. Device according to claim 8, wherein the lower support cap further comprises an annular rib extending axially towards a radial portion of the upper bearing cap while remaining axially spaced apart from the radial portion, and wherein the annular rib of the upper bearing cap radially surrounds the annular rib of the lower support cap.

10. The device according to claim 1, wherein the upper bearing cap comprises an inner skirt comprising a plurality of hooks able to interfere diametrically with hooks provided on the lower support cap.

11. A suspension thrust bearing device comprising:
a lower support cap,
an upper bearing cap, and
at least one bearing arranged between the caps, the upper bearing cap comprising an outer skirt radially surrounding the lower support cap, the outer skirt having a uniform thickness, when viewed in cross-section the outer skirt has a free axial end, wherein
the lower support cap comprises:
at least one annular deflector flange extending towards the outer skirt of the upper bearing cap while remaining radially spaced apart from the outer skirt, the deflector flange having a lower inclined surface extending obliquely downwards,
a radial portion in contact with a lower ring of the bearing, the at least one annular deflector flange extending outwards from the radial portion, and
a radial protrusion extending radially outwards from the radial portion and having a lower surface that extends radially outwards from a lower surface of the radial portion delimiting a bearing surface for a suspension spring, and wherein
the lower support cap has a radially outer surface located between the at least one annular deflector flange and the radial protrusion, a portion of the radially outer surface that axially overlaps the outer skirt getting radially closer to the outer skirt as the radially outer surface extends axially from the at least one annular deflector flange to the radial protrusion, a portion of the outer skirt extending axially so that an innermost axially extending radial surface of the radial skirt extends up to the free end.

12. The device according to claim 11, wherein the lower inclined surface of the annular deflector flange forms an angle with an axially extending central axis of the device comprised between 45° and 65°.

13. The device according to claim 11, wherein the radial protrusion of the lower support cap has an upper inclined surface extending obliquely downwards.

14. The device according to claim 11, wherein the lower support cap further comprises an annular rib extending axially towards a radial portion of the upper bearing cap while remaining axially spaced apart from the radial portion.

15. The device according to claim 14, wherein the lower support cap comprises a radial portion in contact with a lower ring of the bearing, the deflector flange extending outwards from the radial portion, and wherein the annular rib extends from the radial portion of the lower support cap and projects axially upwards, or is flush, with respect to a free upper end of the lower ring of the bearing.

16. The device according to claim 11, wherein the upper bearing cap further comprises an annular rib extending axially towards an upper surface of the deflector flange of the lower support cap while remaining axially spaced apart from the deflector flange.

17. Device according to claim 16, wherein the lower support cap further comprises an annular rib extending axially towards a radial portion of the upper bearing cap while remaining axially spaced apart from the radial portion, and wherein the annular rib of the upper bearing cap radially surrounds the annular rib of the lower support cap.

18. The device according to claim 11, wherein the upper bearing cap comprises an inner skirt comprising a plurality of hooks able to interfere diametrically with hooks provided on the lower support cap.

* * * * *